E. RINGUETTE.
DOOR ATTACHMENT.
APPLICATION FILED SEPT. 6, 1916.
1,244,644.
Patented Oct. 30, 1917.
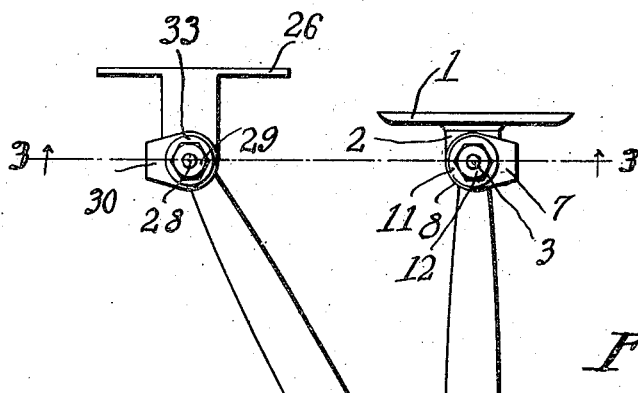
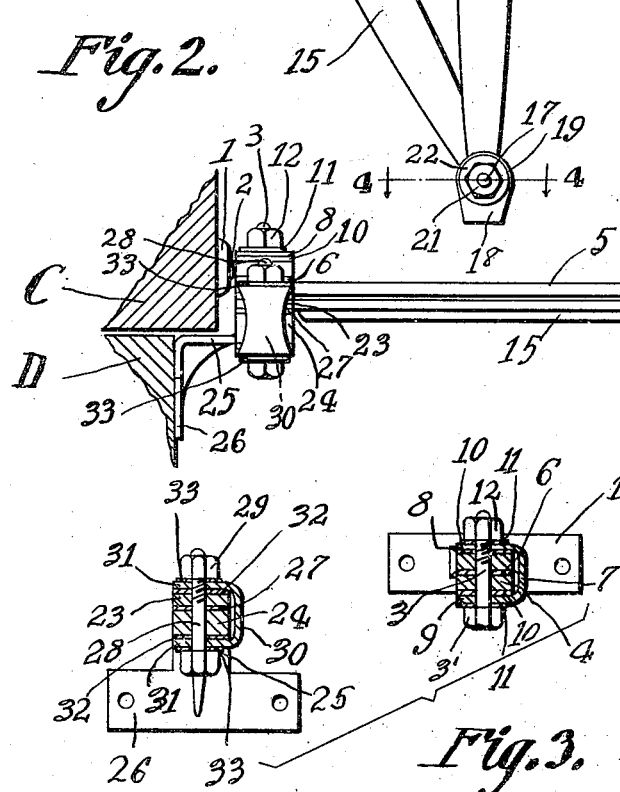
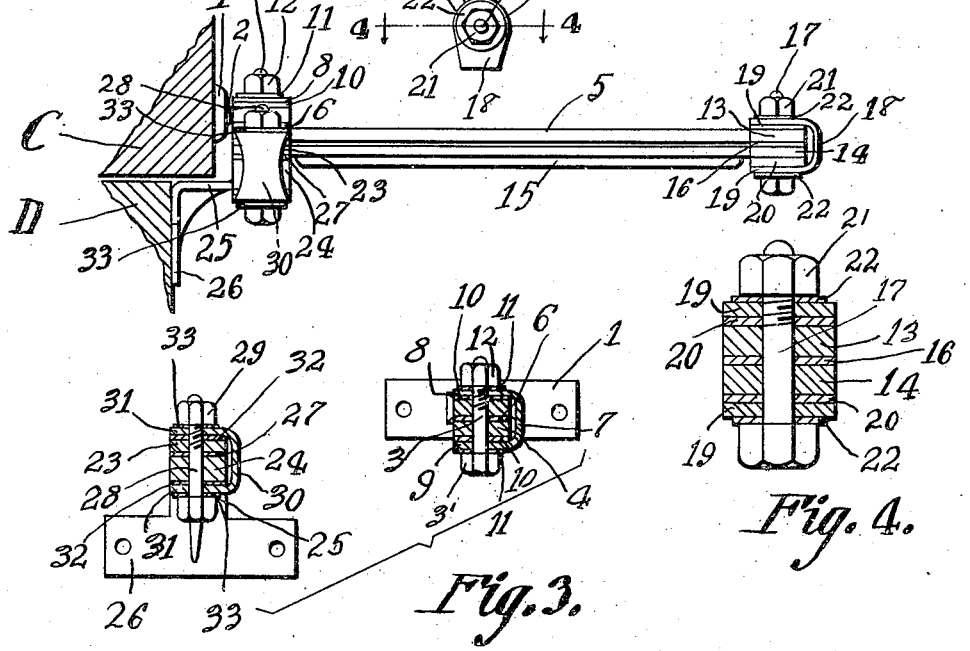
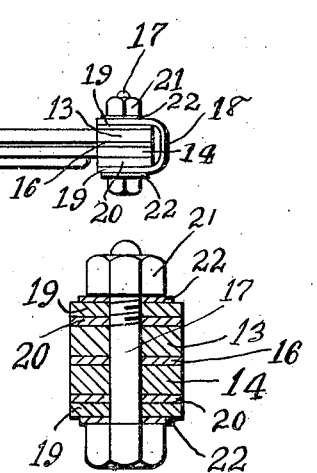
Fig. 1.
Fig. 2.
Fig. 3.
Fig. 4.
Witnesses
E. Ringuette  Inventor
by  Attorneys

UNITED STATES PATENT OFFICE.

ELIE RINGUETTE, OF NORTH ATTLEBORO, MASSACHUSETTS.

DOOR ATTACHMENT.

1,244,644. Specification of Letters Patent. Patented Oct. 30, 1917.

Application filed September 6, 1916. Serial No. 118,734.

*To all whom it may concern:*

Be it known that I, ELIE RINGUETTE, a citizen of the United States, residing at North Attleboro, in the county of Bristol and State of Massachusetts, have invented a new and useful Door Attachment, of which the following is a specification.

This invention relates to attachments for doors and is designed as a means to prevent doors from slamming.

One of the objects of the invention is to provide an attachment of this character which is simple, durable and compact and which can be readily adjusted so as to offer as much resistance as desired to the movement of the door.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of the attachment.

Fig. 2 is a side elevation thereof, the same being shown applied to a door and a door casing, portions of which are shown in section.

Fig. 3 is a section on line 3—3 Fig. 1.

Fig. 4 is a section on line 4—4 Fig. 1.

Referring to the figures by characters of reference 1 designates a bracket having an outstanding ear 2 and extending through this ear is a bolt 3 constituting the pivotal connection between the ear 2 and an eye 4 formed at one end of an arm 5. A washer 6 of fiber or other like material is mounted on the bolt and between the ear 2 and eye 4.

A yoke 7 straddles eye 4 and ear 2 and the ends of the yoke are flattened to form washers 8 and 9 through which the bolt 3 extends. Interposed between the washer 8 and the ear 2 is a washer 10 of fiber or the like and another like washer 10 is interposed between the eye 4 and the washer 9. A metal washer 11 is interposed between the head 3' of the bolt and the washer 9, while another metal washer 11 is interposed between washer 8 and the nut 12 on the bolt.

Formed at the other end of the arm 5 is an eye 13 which laps another eye 14 formed at one end of an arm 15. A washer 16 of fiber or the like is interposed between the two eyes and extending through this washer and the eyes is a bolt 17. A yoke 18 similar to the yoke 7 and the ends of which form washers 19, straddles the eyes 13 and 14, the bolt 17 being extended through the washers 19 and there being washers 20 of fiber or the like interposed between the washers 19 and the eyes. A nut 21 engages the bolt 17 and interposed between this nut and the adjacent washer 19 and between the head of the bolt and the adjacent washer 19 are metal washers 22.

The arm 15 is preferably longer than the arm 5 and has an eye 23 at that end thereof remote from the eye 14. This eye 23 rests on a boss 24 integral with and upstanding from an L-shaped bracket 25, the said bracket being provided with an attaching plate 26. A washer 27 preferably of fiber is interposed between the boss 24 and the eye 23 and extending through these parts is a bolt 28 one end of which is engaged by a nut 29. A yoke 30 straddles the boss 24 and the eye 23 and the ends of this yoke form washers 31 through which the bolt extends. Washers preferably formed of fiber and which have been indicated at 32, are interposed between the washers 31 and the eye 23 and boss 24 respectively. Additional metal washers 33 are preferably interposed between the washers 31 and the head of the bolt and the nut 29 respectively.

In using the device herein described, the bracket 25 is fastened to a door D so as to lie under but close to the door casing C. Thus the boss 24 will extend upwardly above the door opening as shown particularly in Fig. 2. The distance from the hinged edge of the door D to the center of the bracket 25 ordinarily will be about 5½ inches. Then the arm 5 is moved and the bracket 1 is attached to the casing C in such a location that the arm 5 will stand at right angles to the casing. The nuts 12, 21 and 29 are tightened so as to produce as much friction as desired when the arms are moved relative to each other. Consequently when the door is moved to closed position, such movement will be resisted by the friction produced at the joint and, therefore, slamming of the door will be prevented. Furthermore, by tightening the bolts the door can be securely held in any position to which it may be moved.

While the device has been shown for use in connection with a left hand door, it will be apparent that by taking the structure apart and reassembling it with the parts positioned oppositely to those illustrated, the same may be used in connection with a right hand door.

What is claimed is:—

A door attachment including brackets for attachment to a door and door casing respectively, arms of different lengths, pivotal connections between the arms and the respective brackets, a friction element interposed between each arm and its bracket, a yoke straddling each arm and its bracket, friction elements interposed between each yoke and its arm and between each yoke and its bracket, means for tightening said pivotal connections to compress the friction elements adjacent thereto, a pivotal connection between the arms, a friction element between the arms, and means for tightening the last named pivotal connection to compress the friction element between the arms.

In testimony that I claim the foregoing as my own, I have hereto affixed my signature in the presence of two witnesses.

ELIE RINGUETTE.

Witnesses:
 FRED B. BYRAM,
 P. H. LETTRÉ.

Copies of this patent may be obtained for five cents each, by addressing the "Commissioner of Patents, Washington, D. C."